March 26, 1968  W. S. SALISBURY  3,374,567
IDENTIFICATION AND LOCKING MEANS FOR
AUTOMOBILE LICENSE PLATE
Filed June 23, 1965
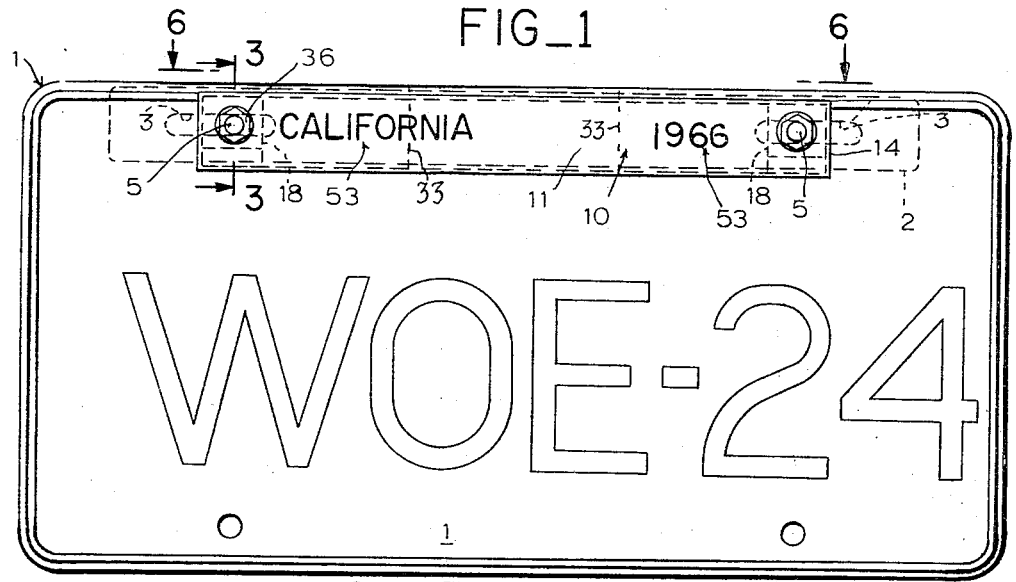
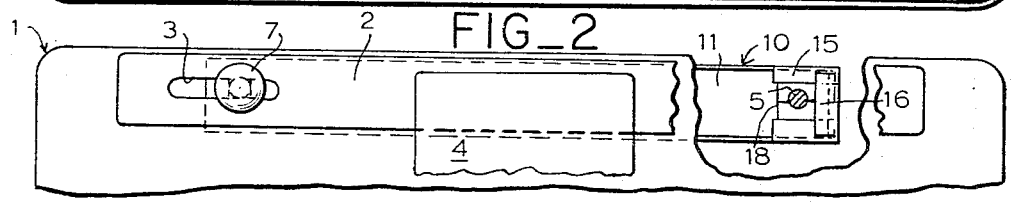
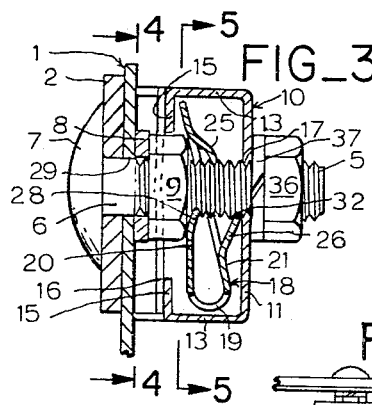
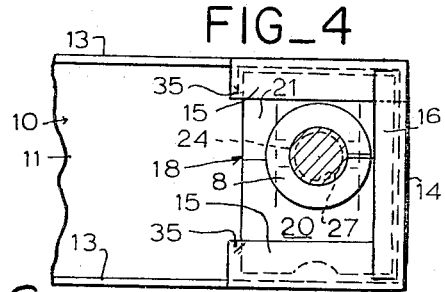
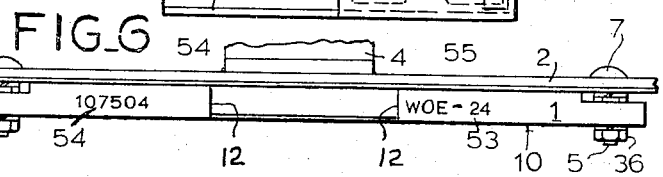
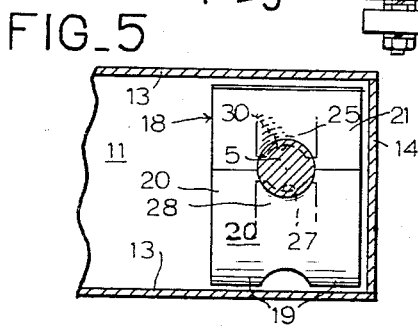
INVENTOR.
WILLIAM S. SALISBURY
BY
Boykin, Mohler & Foster
ATTORNEYS United States Patent Office 3,374,567
Patented Mar. 26, 1968

3,374,567
IDENTIFICATION AND LOCKING MEANS
FOR AUTOMOBILE LICENSE PLATE
William S. Salisbury, 3712 25th St.,
San Francisco, Calif. 94110
Filed June 23, 1965, Ser. No. 466,184
3 Claims. (Cl. 40—203)

ABSTRACT OF THE DISCLOSURE

A locking member adapted to be secured against the outer face of an automobile license plate by the conventional bolts for securing such plate to the automobile, which locking means is adapted to carry annual identifying data, and require destruction thereof for locking purpose in order to remove it from the bolts preparatory to replacement, thereby giving visible evidence of tampering with the license plate.

---

This invention relates generally to a locking means for locking the license plates of an automobile to the conventional plate-supporting bracket, and is an improvement over the locking seal of my United States Letters Patent 2,661,558, issued Dec. 8, 1953.

One of the objects of this invention is the provision of a simple, economically made and readily installable identification and locking means for attachment to the bolts that secure the license plate to an automobile, and which locking means prevents access to the plate-securing nuts on said bolts without destroying said locking means, or so mutilating said means that any observer may readily see that the license plate has been changed or that an attempt has been made to remove it.

A large percentage of criminal activities of the present day involve the use by the offenders of lost, stolen or duplicate license plates. The laws relating to motor vehicles require some annually attachable means for indicating renewal of licenses, or else new license plates are issued annually.

The present invention provides a means that is adapted to annually replace an expired identification means, or one requiring earlier replacement; and which means is adapted to lock the license plate against removal unless such means is destroyed or rendered unusable. The locking means so provided is more readily secured in locking relation to the plate than heretofore and may be installed quickly by a skilled or unskilled person.

Other objects and advantages will be seen in the description and drawings.

In the drawings, FIG. 1 is a front elevational view of a license plate locked on a conventional bracket that, in turn, is of the type that is integral with the automobile.

FIG. 2 is a fragmentary rear view of the upper portion of the plate of FIG. 1 showing the bracket and the plate and bracket are broken away at one point to show one end of the locking means.

FIG. 3 is an enlarged cross-sectional view taken along line 3—3 of FIG. 1.

FIG. 4 is an enlarged fragmentary sectional view taken along line 4—4 of FIG. 3.

FIG. 5 is an enlarged fragmentary sectional view along line 5—5 of FIG. 3.

FIG. 6 is a top plan view of the device of FIG. 1 as seen from the line 6—6 of FIG. 1.

In detail, a license plate of conventional structure is shown at 1, which plate has the license number thereon, and its upper marginal portion is provided with a pair of openings for bolts to secure the plate to the bumper or bracket plate. Such a bracket plate is indicated at 2 (FIG. 2) and is formed with horizontally elongated slots 3 for said bolts. Any one of many brackets 4 (FIG. 2) inseparably secure the bracket plate 2 to the automobile. Insofar as this invention is concerned, bolt openings or slots 3 are of a width adapted to receive therein the square shank of carriage bolts 5, the shank of one of such bolts being indicated at 6 in FIG. 3, adjoining the round head of the bolt. Thus when the bolts 5 extend through the openings or slots 3 with the heads 7 against one of the sides of plate 2, the bolt cannot be rotated due to two of the opposite shank sides substantially engaging the two elongated edges of each slot. Thus such structure, in itself, is conventional.

In securing the license plate 1 to the bracket plate 2, or to the equivalent thereof, the bolts 5 (FIG. 3) are first inserted through the slots 3 from the side of the bracket plate that faces the automobile body, and then through the holes in the upper marginal portion of the license plate. A lock washer 8 may then be placed on each bolt against the face of the plate 1 that faces away from the body of the automobile, which face carries the license number. Nuts 9 are thereafter threaded onto bolts 5 and are tightened against the bracket plate 2.

This procedure, in itself, including the elements described, is common, except that in the present instance the bolts are larger than usual so that they will project a substantial distance outwardly of the forward or front side of the license plate.

In the present invention a horizontally elongated strip of metal, or the like, is provided, which strip is of substantiallly channel shape in transverse cross-sectional contour, having a main, vertically disposed central portion 11 and upper and lower flanges 13 that project to one side of the central portion 11 at substantially right angles thereto, and said flanges preferably extend to points 12 of the latter (FIG. 6), leaving a gap at the center of the strip. End flanges 14 also project to the same side of portion 11 as flanges 13, and said end flanges extend transversely of the lengths of portion 11 between the ends of flanges 13.

Sections 15, or the marginal portions of flanges 13 along their free outer edges, are bent toward each other (FIGS. 3, 4) to extend partially over, but spaced from the ends of the central portion 11, and also the marginal portions 16 of the end flanges 14 along their free edges extend toward each other to extend partially over the ends of central portion 11. By this structure a generally flattened pocket is formed on each end of the channel formed by the central portion 11 and the flanges 13, but which pocket is centrally open at the rear side of the channel.

The words "front," "rear" and words of similar meaning are used with reference to the direction in which the indicia or number-carrying side of the license plate faces, since said side is the forward side of the plate that faces away from the automobile and elements facing or directed "rearwardly" in a direction opposite to the direction in which the number-carrying side of the plate faces. The head of bolt 5 is at the rear side of the license plate, irrespective of whether the plate is at the front or rear end of the automobile, as is bracket plate 2, while the threaded end of bolt 5 projects forwardly from the license plate 1.

The opposite ends of the central portion 11 of each channel strip are each formed with an opening 17 for passage of the threaded ends of each bolt 5 therethrough when the bolts and nuts 9 secure plate 1 to the bracket plate 2. Normally the bracket plate 2 is welded to the bracket 4 and the latter is welded or otherwise permanently secured to a portion of the vehicle. Where plate 1 may constitute a bumper, the latter is rigidly secured to the frame of the automobile or vehicle.

Supported within the flattened pocket at each end of the channel strip is a conventional locking nut, generally designated 18. In the trade, such nuts are called "speed clips" and each comprises a strip of spring metal bent on itself to provide a U-bend 19 intermediate the ends of the strip (FIG. 3) and to provide legs 20, 21 in spaced, generally opposed relation. One leg 20 is shorter than the other leg 21, and the latter is formed with an opening 24 for passage of one of the bolts. The portions 25, 26 at two opposite sides of the opening 24 are permanently sprung to the side of the clip that is opposite to leg 20.

The shorter leg 20 may be slightly more than half the length of leg 21 and it is formed with a semi-circular recess 27 along the free end edge of the leg that is about in register with the side of opening 24, which opening, in turn, is on portion 26 of leg 21. The material 28 of leg 20 along the edge of the recess 27 is permanently bent to the same side of leg 20 as the portion 26 is bent relative to leg 21.

The openings in plate 1 for bolts 5 are designated 29, and, assuming the nuts 9 have together secured plate 1 to the bracket plate 2, the locking clips 18 are positioned on the threaded projecting ends of bolts 5 so that the latter will each extend through each opening 24 in each locking clip 18 with the leg 20 of each clip being at the side of the clip nearer to nut 9.

The legs 20, 21 of each clip 18 will be inclined relative to the axis of the bolt 5 on which it is positioned during movement of a clip onto each bolt in a direction toward nut 9; this inclination is necessary to permit each clip to move along each bolt axially of the latter upon leg 20 of each clip engaging nut 9, further pressure against leg 21 of each locking clip 18 will cause the semi-circular edge of recess 27 (FIG. 5) to enter the groove between an adjacent pair of threads on bolt 5 at one side of the latter, and also the edge 30 of portion 25 of the clip at one side of the opening 24 enter the groove between an adjacent pair of threads at the side of bolt 5 opposite to recess 27. The edge 32 of the opening 24 that is on portion 26 will spring over the threads and into successive spaces between adjacent pairs of threads as the legs 20, 21 are sprung closer together until the clip cannot be removed from bolt 5 except by rotating it relative to the bolt about the axis of the latter. Inasmuch as such rotation is impossible because the clips at both ends of the channel strip 10 are locked to bolts 5, the only way in which the plate 1 can be removed is to break the seal strip 10 at one or more points between the bolts so the pieces at opposite sides of the break can be rotated.

In order to facilitate purposely breaking strip 10, the central portion 11 thereof is scored, perforated or otherwise weakened along one or more lines 33, there being such a line at each of the points 12.

The fact that the portions 25, 26 and 28 on the locking clips 15 extend generally forwardly or toward the central portion 11 of the strip 10, facilitates the initial entry of the bolts 5 through the openings 24 in installing the strip 10. Also the corners 35 (FIG. 4) of the marginal portions 15 that form a portion of the pockets for the clips 18 may be slightly bent toward the central section 11 to prevent the clips from slipping out of the flattened pockets in which they are positioned until the locking strip 10 is secured on bolts 5.

Once the legs 21 of the clips 10 engage the nuts 9, substantially greater resistance is encountered to springing the legs 20, 21 of the clips toward each other. Means for easily effecting the said spring of legs 20, 21 toward each other for positively locking the clips against removal from the bolts is provided in the form of nuts 36.

A lock washer 37 may be positioned between each nut 36 and strip 10, and the nuts 36 are then tightened on the bolts until the edges of the flanges 13 are tight against the forward face of plate 1, at which time the clips 18 will be sprung into positive locking relation to bolts 5. The nuts 36 may therefore be left in place, although their removal will not release the strip 10.

The actual portion 11 of strip 10 may constitute means for carrying any desired indicia or identifying symbols 53, 54 thereon and flanges 13 provide similar means for the same or additional data.

From the foregoing, it is seen that once the nuts 36 have been lightly screwed onto bolts 5 so as to effect the interlock between the clips 18 and bolts 5, the removal of the license plate 1 can only be effected by breaking the strip or seal 10 and then rotating each resultant separable portion thereof for unscrewing the separable locking means or clips 18 from the bolts on which they have been locked. This operation is readily accomplished by the owner of the vehicle for authorized replacement of the strip 10. Thus the seal, which includes the clips 18 may be forced into the bolts axially of the latter but can only be removed by rotating the portion of the seal on each bolt.

It should be noted that heretofore in most states, the indicia carried by the locking strips above described has been carried on the license plate itself, hence the locking strip may perform the function formerly served by the license plate in addition to functioning as a locking means.

While the use of nuts 9 is desirable both for tightly securing the license plate to the bracket plate 2 and for providing a projection for engagement with the locking means 18 to move the latter into firm locking relation with the threaded end of each bolt they are not essential. The locking means may be actuated by any suitable means.

The omission of the flanges 13 between points 12 merely facilitates breaking out its central portion 11 between said points.

It is, of course, obvious that the locking means for each state may bear the name of the state and ample space is provided on both the flanges 13 and central portion 11 for all other data or identifying means that may be desired, and that may be peculiar to the different states.

Preferably the locking strip, while it becomes a part of the license plate in the assembly, has a fluorescent coating or the like for reflecting light at night or in partial darkness.

While a specific locking means 18 has been described in detail, it is to be understood that the invention is not to be restricted to this particular locking means.

The structure of the seal itself may be said to be an elongated strip formed with openings in registration with the pair of bolts that extend in horizontally spaced side by side relation through the license plate, and which strip carries thread engaging means adapted to permit movement thereof, and of the strip, axially of the bolts but which bolt or thread engaging means engages the threads of the bolt against withdrawal of the strip and thread engaging means except by rotation of the latter relative to the bolts. Since the strip is engaged by two spaced bolts they cannot be rotated relative to the bolt and the only way the strip can be removed is to break it so the portions through which bolts extend can be rotated, the bolts themselves being, of course, rigid against rotation relative to the license plate and to the thread engaging means. The latter, as seen in FIG. 4 is held by the strip 10 against rotation relative thereto.

Although but a single embodiment of the invention has been shown and described in detail, it is obvious that changes may be made in the size, shape, detail and arrangements of the elements of the invention within the scope of the appended claims.

I claim:

1. A license plate seal for securing said plate onto a pair of substantially parallel bolts that are in side-by-side relation and exteriorly threaded at one of their corresponding ends, and which bolts have said threaded ends projecting through openings in said plate, comprising:

(a) a horizontally elongated strip of relatively rigid material formed with a pair of bolt openings spaced apart for passage of the threaded ends of said bolts therethrough whereby said strip will be supported on said bolts with one side of said strip in opposed relation to a side of said plate when said strip is moved in one direction onto said bolts axially of the latter with the threaded ends of said bolts extending through said bolt openings;

(b) thread engaging means carried by said strip at said one side thereof and adjacent to each bolt opening of said pair movable with said strip upon said axial movement relative to said bolts into holding engagement with the threads on said bolt against withdrawal of said strips directly axially of said bolts in a direction opposite to said one direction;

(c) means on said strip for holding said thread engaging means against rotation relative to said strip and bolts when said strip is moved onto the threaded ends of said bolts with said thread engaging means in holding engagement with the threads on said ends and said thread engaging means being removable from said threads and bolts upon rotation thereof in one direction relative to said bolts about the axes of the latter, whereby said strip and thread engaging means may be removed from said bolts for removal of such license plate therefrom only upon breaking said strip intermediate said pair of bolt openings to permit rotation of the portions of said strip carrying said thread engaging means together with the thread engaging means carried thereby in said one direction relative to each of said bolts.

2. In a license plate seal as defined in claim 1:
(d) said means for holding said thread engaging means against rotation relative to said strip comprising portions of said strip at each of the ends thereof formed to provide a pocket at each end of said strip in which each of said thread engaging means is held in engagement with the walls thereof.

3. In a license plate seal as defined in claim 1:
(d) said means for holding said thread engaging means against rotation relative to said strip including portions integral with said strip in cooperative relation to such license plate for concealing said thread engaging means against access thereto when said strip and thread engaging means are on said bolts with said thread engaging means in said holding engagement with said threads.

References Cited

UNITED STATES PATENTS

| | | | |
|---|---|---|---|
| 1,944,195 | 1/1934 | Salisbury | 40—202 |
| 2,406,286 | 8/1946 | Gantnier | 40—203 |
| 2,661,558 | 12/1953 | Salisbury | 40—203 |

LAWRENCE CHARLES, *Primary Examiner.*